United States Patent [19]

McCaskill et al.

[11] Patent Number: 4,555,759

[45] Date of Patent: Nov. 26, 1985

[54] SELECTIVE USE OF RESTORED FILE SETUPS

[75] Inventors: Rex A. McCaskill; John W. McInroy; Paul D. Waldo, all of Austin, Tex.

[73] Assignee: International Business Machines Corp., Armonk, N.Y.

[21] Appl. No.: 264,794

[22] Filed: May 18, 1981

[51] Int. Cl.[4] ............................................... G06F 9/00
[52] U.S. Cl. .................................................... 364/300
[58] Field of Search ....................... 364/200, 900, 300; 340/365 VL, 712

[56] References Cited

U.S. PATENT DOCUMENTS

| | | | |
|---|---|---|---|
| 3,701,972 | 10/1972 | Berkeley et al. | 364/200 |
| 3,774,158 | 11/1973 | Clark | 364/200 |
| 3,905,023 | 9/1975 | Perpiglia | 364/200 |
| 4,298,957 | 11/1981 | Duvall et al. | 364/900 |
| 4,308,582 | 12/1981 | Berger | 364/300 |
| 4,315,309 | 2/1982 | Coli | 364/300 |
| 4,357,680 | 11/1982 | Greek, Jr. et al. | 364/900 |
| 4,429,385 | 1/1984 | Cichelli et al. | 364/900 |
| 4,477,880 | 10/1984 | Advanti et al. | 364/900 |
| 4,498,142 | 2/1985 | Advanti et al. | 364/900 |

Primary Examiner—Thomas M. Heckler
Assistant Examiner—John G. Mills
Attorney, Agent, or Firm—Harold E. Meier

[57] ABSTRACT

The specification discloses a method for using stored information about previous file setups to permit portions of the previous file setup to be reconstructed and selectively used for different tasks or for the stored setup to be used for multiple, compatible files. A specified task to be performed on a file is selected by the operator from a task menu. The current frame for the task specified is displayed to the operator. From the displayed frame, the operator requests stored information about a previous file setup from a diskette. Stored information about the previous file setup is interrogated to determine whether the setup contained a current frame and/or frames lower in the hierarchy of the current frame. If the result of the interrogation is positive, the stored information is further interrogated to determine whether the fields in the previous file setup are compatible with the current file. If the result of the second interrogation is positive, the stored information is copied into the current frame and/or frames lower in the hierarchy of the current frame to produce an updated setup containing restored frames.

35 Claims, 10 Drawing Figures

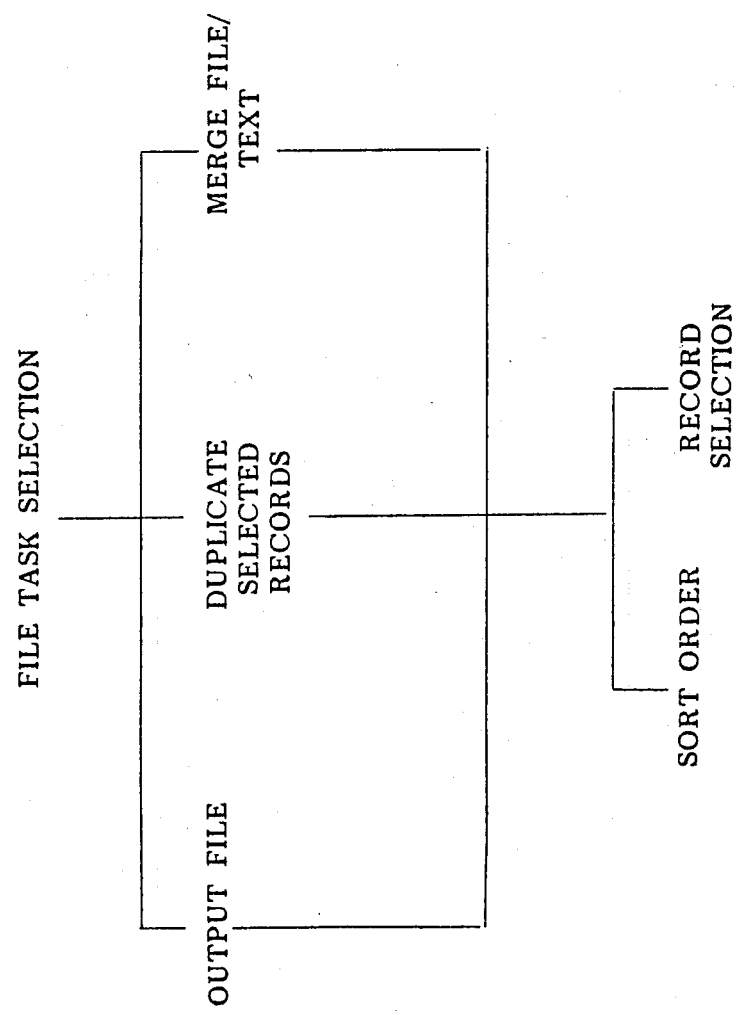

```
|DISK01|                    |               FILE TASK SELECTION              |         |Kyb 1|

ID    ITEM a     Update File
                            b     Output File
                            c     Create File Description
                            d     Revise File Description e     Merge File/Text f     Duplicate Selected Records g     Convert Document to File h     Go to Task Selection
```

Type ID letter to choose ITEM; press ENTER: g

FIG. 2A

```
|Output File    |Recruiting File                            |Kyb  |
|DISK01 |

OUTPUT FILE

YOUR       POSSIBLE
 ID    ITEM              CHOICE     CHOICES a    Print After Output            1 = Yes        2 = No
  b    Output Document Name
  c    Diskette Name d    Document Name for Format
  e    Diskette Name f    Choose Sort Order
  g    Select Records h    Paper Handling      1         1 = Cut Sheet, Manual Feed
                                     2 = Cut Sheet, Automatic Feed
                                     3 = Continuous Feed When finished with this menu, press ENTER.

Type ID letter to choose ITEM; press ENTER: _
```

FIG. 2B

| Merge File/Text | Recruiting File | | Kyb |
|---|---|---|---|
| DISK01 | | | |

MERGE FILE/TEXT

| ID | ITEM | YOUR CHOICE | POSSIBLE CHOICES |
|---|---|---|---|
| a | Shell Document Name | | |
| b | Diskette Name | | |
| c | Output Choice | 1 | 1 = Repetitive Letters<br>2 = File Listing or Report |
| d | Print Merged Document | 1 | 1 = Yes    2 = No |
| e | Output Document Name | | |
| f | Diskette Name | | |
| g | Choose Sort Order | | |
| h | Select Records | | |
| i | Cancel on Error | 1 | 1 = Yes    2 = No |
| j | Paper Handling | 1 | 1 = Cut Sheet, Manual Feed<br>2 = Cut Sheet, Automatic Feed<br>3 = Continuous Feed |

When finished with this menu, press ENTER.
Type ID letter to choose ITEM; press ENTER: a

*FIG. 2C*

```
|Dupl. Selected Recs.|Recruiting File        |          |Kyb  |
|DISK01|                                     |          |     |
                     DUPLICATE SELECTED RECORDS

ID    ITEM                YOUR CHOICE a     New File Name
         b     Diskette Name       DISK01
         c     Error File Name d     Choose Sort Order
         e     Select Records When finished with this menu, press ENTER.
Type ID letter to choose ITEM; press ENTER: a
```

*FIG. 2D*

| Merge File/Text | Recruiting File | | | | | Kyb | 1 | |
|---|---|---|---|---|---|---|---|---|
| DISK011 | | | | | | | | |

RECORD SELECTION

Key

| Rec_ID | Last_Name | First_Name | MI | School | Degree | GPA | City | State |
|---|---|---|---|---|---|---|---|---|
| ▫ ▫ ▫ | ▫ ▫ | ▫ ▫ | | | | | | |
| ▫ ▫ ▫ | ▫ ▫ | ▫ ▫ | ▫ ▫ ▫ | ▫ ▫ ▫ | ▫ ▫ | ▫ ▫ | ▫ ▫ ▫ | ▫ ▫ ▫ |
|  |  |  |  |  | ▫ ▫ | ▫ ▫ | ▫ ▫ ▫ | ▫ ▫ ▫ |

When finished with this frame, press RECORD END.
Type field contents to be used in selecting records.
If no field contents are typed, all records will be selected.
Press NEXT VAR or ENTER to move cursor to next field.

FIG. 2E

| Merge File/Text | Recruiting File | | | Kyb | |
|---|---|---|---|---|---|
| DISK01 | | | | | |

SORT ORDER

| ID | ITEM | YOUR CHOICE | POSSIBLE CHOICES | |
|---|---|---|---|---|
| a | First Field Name | | | |
| b | Sort Order | 1 | 1 = Low to High | 2 = High to Low |
| c | Second Field Name | | | |
| d | Sort Order | 1 | 1 = Low to High | 2 = High to Low |
| e | Third Field Name | | | |
| f | Sort Order | 1 | 1 = Low to High | 2 = High to Low |
| g | Fourth Field Name | | | |
| h | Sort Order | 1 | 1 = Low to High | 2 = High to Low |
| i | Fifth Field Name | | | |
| j | Sort Order | 1 | 1 = Low to High | 2 = High to Low |

When finished with this menu, press ENTER.

Type ID letter to choose ITEM; press ENTER: _

FIG. 2F

```
|DSK00 1|            REQUEST TASKS                      |Kyb  1|

ID    ITEM a     Print Document
             b     Display Print Queue or Cancel Print Job
             c     Change Printing Order d     Display Index of Liskette Contents e     Continue Printing With Element Now On Printer f     Request Printer
             g     Release Printer

*   h     Recall Setup
         **  i     Store Setup

Type ID letter to choose ITEM; press ENTER: g
```

FIG. 2G

SELECTIVE USE OF RESTORED FILE SETUPS

DESCRIPTION

Technical Field

In word processing systems currently in use, such as the IBM Office Systems 6, the operator has the ability to select a task and appropriate qualify and sort criteria and store this setup on a diskette. However, when such a setup is recalled, the same task must again be specified by the operator for a different file task.

The manual entry of the same or similar parameters in a set of related frames is not only tedious, giving rise to operator error, but time consuming. Accordingly, a method for storing and recalling setups on a diskette is needed whereby all or part of the stored setup can be applied to a different file task or used with different files and whereby portions of different file task setups can be selected and combined to perform a job and create a new setup.

SUMMARY OF THE INVENTION

In accordance with the present invention, a method of word processing is provided for recalling and using a file task setup for a different file task with the same file. The specific task to be performed on a file is selected from the task menu. The current frame for the task specified is displayed to the operator. From the displayed frame, the operator requests information from a diskette about a previous file setup stored on a diskette. The stored information setup is interrogated to determine positively or negatively whether the previous setup contained frames in the hierarchy of the current frame. When the result of the interrogation is positive, the stored information is copied into the current frame and/or subordinate frames in the hierarchy of the current frame to produce an updated setup containing the current frame and the restored frames. The updated setup is then displayed to the operator for subsequent execution.

In accordance with yet another aspect of the present invention, a method of word processing is provided which permits a stored file task setup to be recalled and applied to files compatible with that setup. A specific task to be performed on a particular file is selected from a file task menu. The current frame for the specified task is displayed to the operator. From the displayed frame, the operator requests stored information about a previous file setup stored on a diskette. The stored information is interrogated to determine positively or negatively whether the setup contained the current frame and/or frames lower in the hierarchy of the current frame. If the result of the interrogation is positive, the stored information is further interrogated to determine positively or negatively whether the fields in the previous setup are compatible with the current file. If the result of this interrogation for any frame is positive, then the stored information for that frame is copied into the corresponding frame of the setup to produce a new setup of restored frames. The new setup of restored frames is then displayed to the operator for subsequent execution.

In accordance with yet another aspect of the present invention, a method of word processing is provided which permits portions of a stored file task setup to be recalled and used with different tasks and applied to different files. A specific task to be performed on a particular file is selected from a file task menu. The current frame for the specified task is displayed to the operator. From the displayed frame, the operator requests stored information about a previous file setup stored on a diskette. The stored information is interrogated to determine positively or negatively whether the previous setup contained frames in the hierarchy of the current frame. When the result of the interrogation is positive, the stored information is further interrogated to determine positively or negatively whether the fields in the previous setup are compatible with the current file. When the results of both interrogations are positive, the stored information is copied into the subordinate frames in the hierarchy of the current frame to produce an updated setup of restored frames. The current frame of the updated setup is then displayed upon request to the operator for subsequent execution. Subordinate frames of the updated setup may also be displayed to the operator upon request.

DESCRIPTION OF THE DRAWINGS

For a more complete understanding of the present invention and for further objects and advantages thereof, reference is now made to the following detailed description taken in conjunction with the accompanying drawings in which:

FIG. 1 is a diagrammatic illustration of a hierarchy of file tasks performed in a typical word processing system;

FIG. 2A–2H show various frames displayed to an operator to facilitate operation of a method for utilizing stored filed setups according to the present invention.

DETAILED DESCRIPTION

Figure 2H:
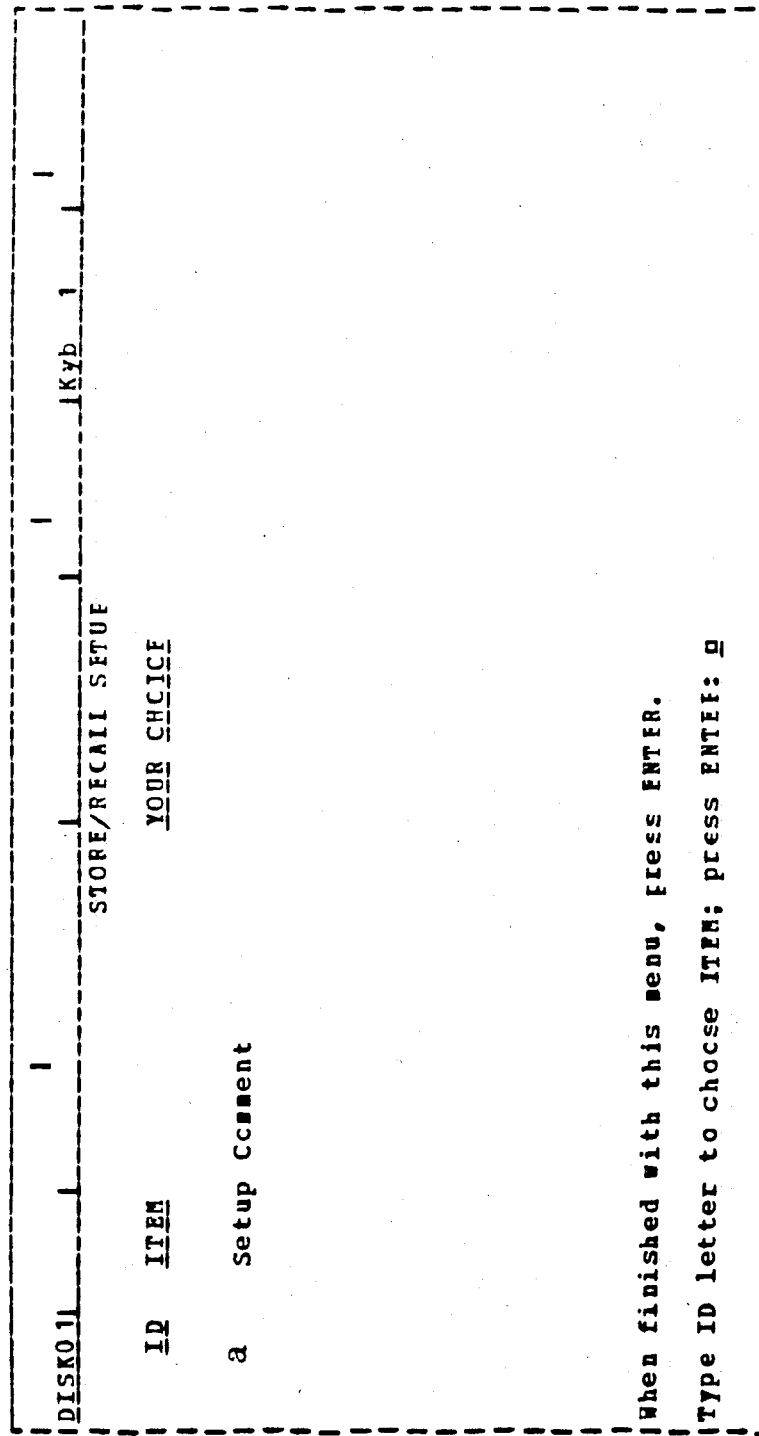

The present invention employs methods for efficiently storing and recalling file setups on or from a diskette or other storage media to permit portions of one file task setup to be used with a different file task, or different files or for portions of a stored file task setup to be selected and combined to perform a job or create a new setup.

A file setup is a setup of up to three frames whereby a task chosen from a task menu and certain parameters are specified to perform a job. The menu facility is used by the operator to invoke the tasks or functions to be performed and to specify a set of parameters which govern how the task will be performed. Menus are used to invoke tasks and to request certain functions, such as the store or recall of a file setup.

In a word processing system, typical file tasks include file creation, revision, update, output, duplication, merge file with the text, or conversion of documents into files. Tasks such as output file, merge file with text and duplicate selected records are the kind of tasks which are likely to be performed often with little or no change in the parameters describing the task. FIG. 1 is a menu tree for such file tasks, illustrating the hierarchy of tasks performed.

As shown in FIG. 1 the output file, merge file/text and duplicate selected records tasks involve certain subordinate frames, such as record selection and sort order. For example, to output certain records, the output file task frame is selected and then certain records are designated in the record selection frame and/or sort order frames.

An operator may select a task from the file task selection menu frame by typing the appropriate ID letter and pressing the ENTER key. The system will then prompt the operator for the name of the file and/or the name of the diskette to be used. The setup invoking the merge file/text, duplicate selected records and output file tasks may be saved on a storage media such as a diskette and recalled. This is done by storing the state information necessary to reconstruct the frame that the operator has created for a particular task.

When frames are saved in an existing setup, a decision must be made whether to store frames already in the setup which are not in the hierarchy for the setup being saved. The rule for determining what frames are saved is that only the frame currently displayed and all frames below it in the hierarchy of frames for that task are saved. For example, suppose the frame currently displayed is the output file frame. Since the sort order and record selection frames can be specified as part of the output file setup, those frames will be saved along with the output file frame if the operator requests storage of the setup while that frame is displayed. When these frames are saved, all other existing frames in the stored setup are deleted and the state information of the frames to be saved is stored on the diskette or other storage media. This "rule" allows the operator to know precisely what frames are saved on the diskette, and this saves diskette space which would otherwise be taken up by unwanted frames.

When a setup is saved on a diskette, state information about the setup of frames determined by the task of the current frame is stored. Since some frames are common to different tasks, namely record selection and sort order, these common frames can be used according to the present invention with different tasks without requiring the operator to retype the parameters. For example, suppose the operator is working in a duplicate frame and saves that frame and those lower in the hierarchy containing the parameters specifying the records to be duplicated. In a subsequent task in which the operator desires to output the same records previously specified in the duplicate task, the record selection frame may be recalled and used with the output task. The advantage of this selective recall is that time is saved setting up a task and errors are avoided.

Some applications require use of multiple files. A common example is the name and address file that is split into parts to facilitate processing. Such a file, for example, might be split alphabetically by last name into three files: names beginning with A-H, I-L and M-Z. The present invention provides the capability to use a setup for all three files instead of requiring different, identical setups for each. In this instance, a setup created while processing one file can be used to process other files in which the fields of the respective files are compatible. Use of setups with multiple files and with different file tasks results in reduced operator time, avoidance of errors and saving of diskette space.

FIG. 2A shows the frame displayed for the file task selection menu. An operator may select a task from the file task selection menu by typing the appropriate ID letter and pressing the ENTER key. The system will prompt the operator for the name of the file and possibly the name of the diskette used. When both a file name and/or the diskette name have been successfully specified, the system will respond by displaying the appropriate menu for the selected task.

FIGS. 2B, 2C and 2D show, respectively, the frames displayed for each of the selected tasks: the output file, the merge file/text and the duplicate selected records.

The frames shown in FIGS. 2B, 2C and 2D show the file task menus from which the operator keys in parameters to indicate whether a report is generated or a set of records is to be output and the form the output is to take. If only selected records are to be output, the operator requests the record selection frame by entering the appropriate ID. Likewise, the operator may also specify the sort order to output the records in particular order.

If the operator chooses the select records directive option, the record selection frame is displayed to allow the operator to specify the criteria by which the records are to be selected for output by this task. The frame shown in FIG. 2E is the record selection menu. This menu is used to specify which records are to be output, merged with text or duplicated (depending upon the higher order task).

Similarly, if the operator chooses the sort order option, the sort order frame will be displayed for the operator to identify the fields and type of sort (ascending or descending) to be performed before the output file, merge file/text or duplicate selected records tasks are executed. The frame shown in FIG. 2F is the sort order menu. It permits the operator to specify an ascending or descending sort of a predetermined number of fields. The source records will be output, merged with text or duplicated, depending upon the higher order task in a collating sequence based on the contents of the specified fields. If no fields are specified, the higher order task will be performed in sequence by ascending value of the file record IDs.

When the operator has selected a particular task or tasks and desires to store or recall a file setup, the operator uses the REQUEST key to initiate either of these functions. As earlier described, if one of the higher order task menus is displayed (i.e., output file, merge file/text or duplicate), the current frame and all frames lower in the hierarchy are stored or recalled. If the operator depresses the REQUEST key while the select record or sort order menu is displayed, only the record selection or sort order sequence of the setup will be recalled or stored.

When the operator depresses the REQUEST key while one of the file task menus, FIGS. 2B-2D, is displayed, the request task menu is displayed. The request task menu is shown in FIG. 2G. Setup operations are selected from the request task menu from which the operator can either store or recall a setup. A store setup request will transfer the setup parameters in the menu frame from which the request is invoked and those parameters in all subordinate frames. A recall setup request will transfer setup parameters from the stored setup on the diskette to the menu frame from which the request is invoked if parameters for that menu frame are present in the stored setup. A recall setup request will transfer parameters into subordinate frames, also, to the extent that parameters for those frames exist in the stored setup.

Figure 3:
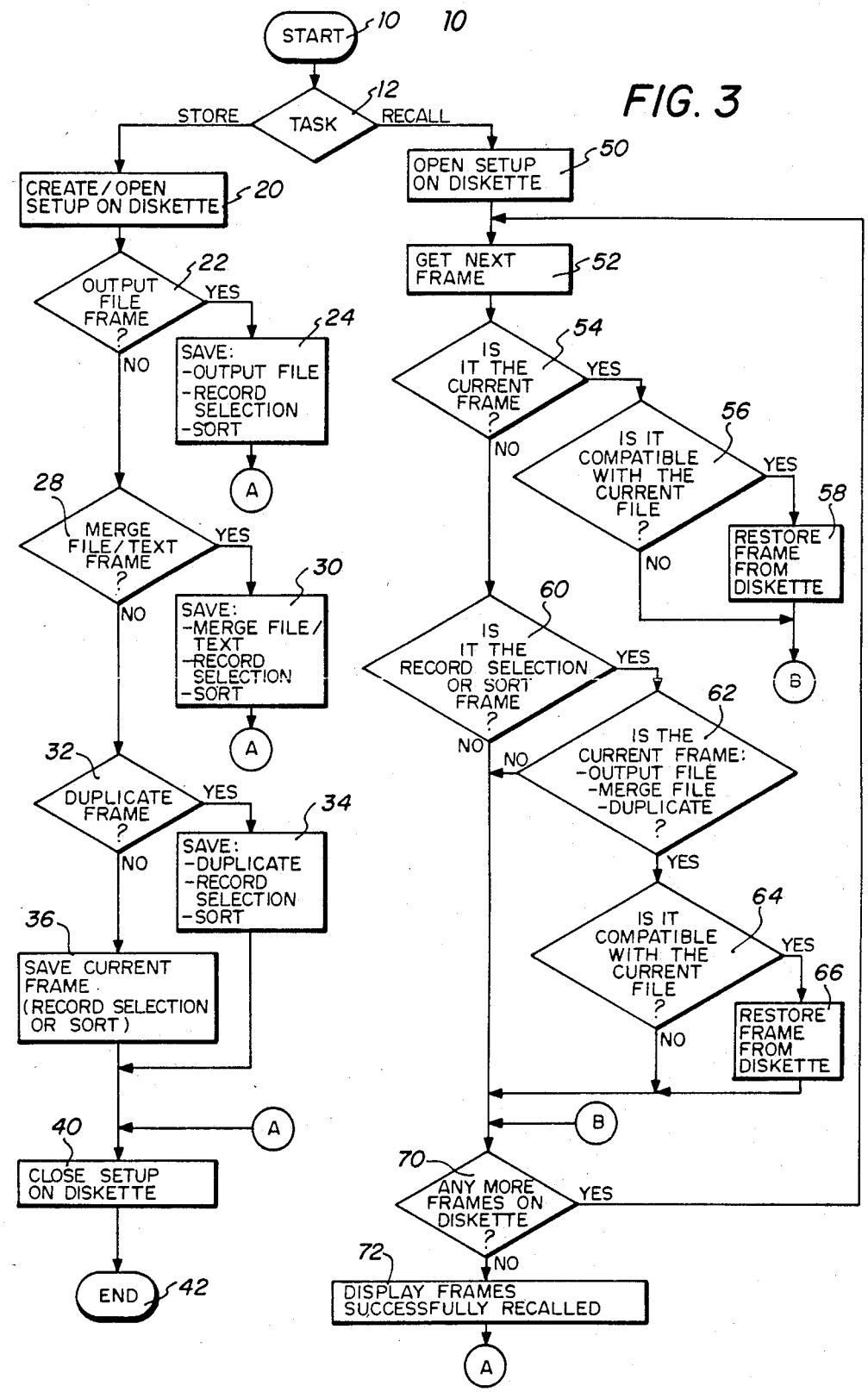
FIG. 3 is a detailed flowchart representation of a store and recall routine of the method for utilizing stored file setups of the present invention.

Reference is now made to the FIG. 3, which illustrates the logic employed in the routine for storing and recalling a file setup. The routine is initiated, as indicated by the block identified by the numeral 10, when the operator presses the REQUEST key in one of the menus or frames from which the setup transfers are permitted (output file, merge text/file, duplicate, record selection, sort order). The request task menu shown in FIG. 2G is displayed. The operator then keys the ID of the "store setup" or "recall setup" option and presses ENTER to select the store or recall task as shown by the block 12 in the figure.

Before leaving the frame currently displayed, the system may prompt for the setup name by displaying the following on the Prompt Line:

Type Setup Name; Press ENTER ☐

Under some conditions, the system may also prompt for the diskette name:

Type Diskette Name; Press ENTER ☐.

The store/recall setup menu shown in FIG. 2H is then displayed and the operator optionally keys in a descriptive comment. When the operator makes these choices and presses ENTER, the store or recall function is initiated.

When the store setup selection is made from the request menu, this subcomponent is executed. The destination of the setup information is solicited from the operator. The information stored is dependent on the state of the files function in progress when the REQUEST key was pushed. The setup information stored consists of some combination of the following:

(1) Qualify Parameters—the information in the qualify buffer that is used to create the record selection frame as it was last seen.
(2) Sort Parameters—the sort sequence as specified by the sort order menu.
(3) Output File Parameters—the parameters in the output file menu.
(4) Merge/File Text Options—the options specified in the merge file/text menu.
(5) Duplicate File Options—the options specified in the duplicate file menu.

Referring once again to the FIG. 3, the logical procedure for storing a setup will first be described. When the operator selects the store setup request, the system processes this request in accordance with the logic of the left-hand branch of the flow chart. When the store setup menu is displayed to the operator, the setup name entered by the operator is the name of the dataset on the diskette that the setup will be written to. If the dataset already exists, the data in it is deleted before storing the setup. If the dataset does not exist, it is created as shown by block 20 in the figure. Where no dataset exists, a setup is created on the diskette. The service programs are told to create a new setup on the diskette which includes putting the name given to the setup in the table of contents of the diskette, putting the required architectural information on the diskette and other servicing that may be required to get the diskettes ready to store data.

When a setup has been created (or the named dataset has been located), a test is made at 22 to determine whether the current frame, i.e., the frame from which the operator invoked the request, is the output file frame. If it is, state information about the output file, record selection and sort order frames are stored (block 24) in the named dataset on the diskette and the setup is closed on the diskette at 40, having stored the state information in the dataset necessary to reconstruct the current frame and all frames lower in the hierarchy. If it is determined at 22 that the current frame is not the output file frame, then a test is made at 28 to determine whether the current frame is the merge/file text frame. If it is, then the state information necessary to reconstruct the merge file/text, record selection and sort order frames is written in the dataset as shown in block 30. The request is then complete and the setup is closed at 40. At 40, the service programs shut down the transfer mechanism, cleanup indicators, pointers and extraneous information and complete any unfinished tasks. At this point, the routine is terminated as shown by the block 42.

If it is determined at 28 that the current frame is not the merge file/text frame, a test is then made at 32 to determine whether the current frame is the duplicate frame. If it is, the state information necessary to reconstruct the duplicate, record selection and sort order frames is stored, as indicated by block 34, the setup is closed at 40 and the routine is terminated at 42. If the current frame is not one of the higher order tasks, it must be a record selection or sort order frame since these are the only remaining possible frames from which a request task could have been invoked. Accordingly at 36, the current frame is saved, the setup is closed at 40 and the procedure is terminated at 42.

When the "Recall a Setup" selection is made from the request menu, this component is executed. The source of the setup information is solicited from the operator. The operator is notified of an error if the source setup information is incompatible with the task being executed. The source setup will be incompatible if the field descriptions are incompatible with the file being accessed. The information that can be recalled is the same information that is stored.

The recall setup request is the converse of the store setup. When a setup is recalled, the appropriate state information of the previously saved frames is copied from the stored dataset into the active setup to restore one or more of the previous frames. The rule governing what information is transferred is the same as that for the store setup, namely, stored information will be copied, where appropriate, into the current frame and all frames lower in the hierarchy. The recall setup logic is shown on the right-hand branch of the flowchart of FIG. 3. At 50, the setup is first opened on a diskette. The service programs go to the table of contents of the diskette, locate the dataset specified by the operator and set up the control blocks so that the stored information can be transferred. Once this function is complete, the service programs are instructed at block 52 to get the next saved frame in the setup from the diskette. This information is then tested at block 54 to determine if the saved frame is the same as the current frame from which the request is initiated. If, for example, the saved frame is a duplicate frame and the request was made from the duplicate frame, then the frame is tested at 56 to determine its compatability with the current file.

The use of a stored setup with different files requires that files in which the setup is used be compatible since the frame information which is saved or recalled specifies conditions on the file which must be true for it is to be used. For example, in the record selection frame, information is saved at each field in the file that was being used when the operator filled out the record selection frame. Unless the other files to be used in the setup contain the same kind of information, the setup cannot be used to process these files.

The stored frame is compatible with the current file if two conditions are satisfied. The field names of the file being recalled must match (be present in) the file being used. If the fields match, the field types must also be the same, i.e., arithmetic, character or text, or satisfy some other conditions in which different field types are appropriate. If a determination is made that the file information saved is compatible with the current file being processed, then the frame is restored from the diskette at 58. If not, the frame will not be restored. At 70, determination is then made whether any more frames were saved on the diskette. If not, the frames successfully restored, if any, are displayed to the operator at 72, the setup is then closed at 40 and the routine is terminated at 42. If more datasets are present on the diskette, the next dataset is retrieved at 52 and tested at 54 as before to determine if it is the same as the current frame. If so, the file information is tested for compatibility with the current file at 56 as previously described. If the dataset does not represent the same frame as the current frame, it is tested again at 60 to determine whether the dataset represents a record selection or sort frame. If not, the routine determines at 70 whether there are any more frames saved on the diskette. If not, the frames successfully recalled will then be fully restored and displayed to the operator at 72 and the routine will terminate as described above. If additional frames were saved, the next frame will be tested at 54 as previously described. If a determination is made at 60 that the frame represents a record selection or sort order frame, then further interrogation is conducted at 62 to ensure that the current frame is one of the higher order frames which can recall a record selection or sort frame. If so, the frame is then tested for file compatibility at 64, as is done at 56, and if file compatability is present, the frame is restored from the diskette.

When all frames saved on the diskette have been tested, those which were successfully recalled are displayed at 72 and the routine is terminated. At this point, the appropriate state will have been copied into the current frame and/or into any subordinate frames and will appear in these frames if the operator selects them.

The operator may then display the updated file setup, make further modifications such as by changing parameters, execute the job or store the updated setup as an updated setup or as a new file setup.

It may thus be seen that the present invention provides substantial improvements to a word processing system. The present system has the ability to store and recall setups with minimum storage space, operator time and error. File setups may be recalled and reused. Portions of one setup, such as record selection or sort frames, may be used in other setups to eliminate time consuming filling in of these frames. Finally, the present invention has the capability of using one setup for any number of compatible files, with the same or with different tasks.

Whereas the present invention has been described by reference to specific embodiments thereof, it will be understood that various changes and modifications will be suggested to one skilled in the art, and it is intended to encompass such changes and modifications as fall within the scope of the appended claims.

What is claimed is:

1. A method for utilizing stored file setups in a word processing system having a processor, keyboard, display and a storage medium, comprising the steps of:
   (a) prompting an operator to select, via said keyboard, a specified task to be performed on a file from a task menu displayed on said display;
   (b) displaying on said display a current frame for the specified task;
   (c) prompting the operator to input, via said keyboard, a name of a previous file setup stored on the storage medium while the current frame is being displayed;
   (d) determining positively or negatively whether the previous file setup contained frames in a hierarchy of the current frame; and
   (e) copying the stored information in the frames of the previous file setup into frames in the hierarchy of the current frame to produce an updated setup of restored frames when a result in step (d) is positive.

2. The method of claim 1 wherein the current frame is the output file frame.

3. The method of claim 1 wherein the current frame is the merge file/text frame.

4. The method of claim 1 wherein the current frame is the duplicate selected records frame.

5. The method of claim 1 wherein the current frame is the record selection frame.

6. The method of claim 1 wherein the current frame is the sort order frame.

7. The method of claim 1 further comprising the step of (f) displaying the updated setup of step (e) to the operator.

8. The method of claim 7 further comprising the step of (g) storing state information about the updated setup obtained in step (e).

9. A method of utilizing stored file setups in a word processing system having a processor, keyboard, display and a storage medium, comprising the steps of:
   (a) prompting an operator to select, via said keyboard, a specified task to be performed on a file from a task menu displayed on said display;
   (b) displaying on said display a current frame for the specified task;
   (c) prompting the operator to input, via said keyboard, a name of a previous file setup stored on the storage medium while the current frame is being displayed;
   (d) determining if fields in a frame of the previous file setup are compatible with a current frame;
   (e) copying stored information in the frames of the previous file setup into the current frame or into a frame lower in a hierarchy of the current frame to produce an updated setup of restored frames when a result in step (d) is positive.

10. The method of claim 9 wherein the current frame is the output file frame.

11. The method of claim 9 wherein the current frame is the merge file/text frame.

12. The method of claim 9 wherein the current frame is the duplicate selected records frame.

13. The method of claim 9 wherein the current frame is the record selection frame.

14. The method of claim 9 wherein the current frame is the sort order frame.

15. The method of claim 9 further comprising the step of (f) displaying the updated setup to the operator.

16. The method of claim 9 wherein the stored information is interrogated in step (d) to determine:
   (1) whether the fields in the previously stored setup are present in the current file; and
   (2) whether the field types of the fields of the previously stored setup are the same field types as the fields present in the current file.

17. The method of claim 9 further comprising the step of (g) modifying information displayed to the operator in the updated setup.

18. The method of claim 9 further comprising the step of (h) storing state information about the updated setup.

19. A method of utilizing stored file setups in a word processing system having a processor, keyboard, display and a storage medium, comprising the steps of:
   (a) prompting an operator to select, via said keyboard, a specified task to be performed on a file from a task menu displayed on said diaplay;
   (b) displaying on said display a current frame for the specified task;
   (c) prompting an operator to input, via said keyboard, a name of a previous file setup store on the storage medium while the current frame is being displayed;
   (d) determining positively or negatively whether frames in the previous file setup are contained in the current frame or in frames lower in a hierarchy of the current frame;
   (e) determining if fields in a frame of the previous file setup are compatible with a current file when a result in step (d) is positive; and
   (f) copying stored information in the frames of the previous file setup into the current frame or into a frame lower in the hierarchy of the current frame to produce an updated setup of restored frames when the result in step (d) is positive.

20. The method of claim 19 further comprising the step of:
   (g) displaying the updated setup to the operator.

21. The method of claim 19 wherein the current frame is the output file frame.

22. The method of claim 19 wherein the current frame is the merge file/text frame.

23. The method of claim 19 wherein the current frame is the duplicate selected records frame.

24. The method of claim 19 wherein the current frame is the record selection frame.

25. The method of claim 19 wherein the current frame is the sort order frame.

26. The method of claim 19 wherein the stored information is interrogated in step (e) to determine:
   (1) whether the fields in the previously stored setup are present in the current file; and
   (2) whether the field types of the fields of the previously stored setup are the same field types as the fields present in the current file.

27. The method of claim 19 further comprising the step of:
   (g) repeating steps (c)–(f) when it is determined that stored information corresponding to another frame in the same setup is present in the storage medium.

28. The method of claim 19 further comprising the step of:
   (j) modifying information displayed to the operator in the updated setup.

29. The method of claim 19 further comprising the step of:
   (k) storing state information about the updated setup on the storage medium.

30. A method of utilizing file setups in a word processing system having a processor, keyboard, display and a storage medium, comprising the steps of:
   (a) prompting an operator to select, via said keyboard, a first task to be performed on a first file from a task menu displayed on said display;
   (b) displaying on said display a frame for said first task selected in step (a);
   (c) storing information about a state of the frame displayed in step (b) and any subordinate frames on the storage medium as a previous file setup;
   (d) prompting an operator to select, via said keyboard, a second task to be performed on a second file from the task menu displayed on said display at some subsequent time;
   (e) displaying on said display a current frame for said second task;
   (f) prompting the operator to request, via said keyboard, information stored on the storage medium in step (c) while the current frame is being displayed in step (e);
   (g) interrogating said stored information to determine positively or negatively whether the previous file setup contains frames in a hierarchy of the current frame;
   (h) interrogating said stored information to determine positively or negatively whether said second task is a record selection or sort order task when a result of the interrogation in step (g) is negative;
   (i) interrogating said stored information to further determine positively or negatively if said first and said second files are compatible when a result of the interrogations in step (g) or (h) is positive;
   (j) copying the stored information in the current frame or the record selection or sort order frames to produce an updated setup of stored frames when a result of the interrogation in step (i) is positive; and
   (k) repeating steps (f)–(j) when it is determined that store information about another frame is present on the storage medium.

31. The method of claim 30 wherein said first and said second files are different.

32. The method of claim 30 wherein said first and said second tasks are the same.

33. The method of claim 30 wherein said first and said second tasks are different.

34. The method of claim 30 wherein said second task is record selection.

35. The method of claim 30 wherein said second task is sort order.

* * * * *

UNITED STATES PATENT AND TRADEMARK OFFICE
CERTIFICATE OF CORRECTION

PATENT NO. : 4,555,759
DATED : November 26, 1985
INVENTOR(S) : Rex A. McCaskill; John W. McInroy; Paul D. Waldo It is certified that error appears in the above-indentified patent and that said Letters Patent is hereby corrected as shown below:

Col. 8, line 41, please delete "frame" and insert --file--.

Signed and Sealed this

Tenth Day of June, 1997

Attest:

BRUCE LEHMAN

Attesting Officer        Commissioner of Patents and Trademarks